United States Patent
Kokomoto (10) Patent No.: US 8,855,517 B2
(45) Date of Patent: Oct. 7, 2014

(54) IMAGE FORMING APPARATUS HAVING LOOPED BELT AND METHOD OF DETECTING INDEX

(71) Applicant: Kyocera Document Solutions, Inc., Osaka (JP)

(72) Inventor: Mari Kokomoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 37 days.

(21) Appl. No.: 13/760,617

(22) Filed: Feb. 6, 2013

(65) Prior Publication Data

US 2013/0200126 A1  Aug. 8, 2013

(30) Foreign Application Priority Data

Feb. 8, 2012  (JP) ................. 2012-024646

(51) Int. Cl.
*G03G 21/14* (2006.01)
*G03G 15/01* (2006.01)
*G03G 15/00* (2006.01)
*B65G 43/00* (2006.01)

(52) U.S. Cl.
CPC ........ *G03G 15/5054* (2013.01); *G03G 15/0189* (2013.01); *G03G 15/755* (2013.01); *G03G 2215/0158* (2013.01); *G03G 2215/0132* (2013.01); *B65G 43/00* (2013.01); *G03G 2215/0016* (2013.01); *G03G 2215/00143* (2013.01)

USPC .............................................. 399/76; 399/66

(58) Field of Classification Search
CPC ............. G03G 15/50; G03G 15/5008; G03G 15/5054; G03G 2215/0016
USPC .............................................. 399/66, 75, 76
See application file for complete search history.

(56) References Cited

U.S. PATENT DOCUMENTS

| | | | | |
|---|---|---|---|---|
| 5,768,671 | A * | 6/1998 | Komiya et al. | 399/301 |
| 5,784,676 | A * | 7/1998 | Iseki et al. | 399/301 |
| 2003/0214568 | A1* | 11/2003 | Nishikawa et al. | 347/116 |
| 2008/0124114 | A1* | 5/2008 | Yamagata et al. | 399/74 |
| 2011/0123202 | A1 | 5/2011 | Mori | |
| 2013/0112530 | A1* | 5/2013 | Fujii | 198/617 |

* cited by examiner

*Primary Examiner* — Benjamin Schmitt
(74) *Attorney, Agent, or Firm* — K&L Gates LLP (57) ABSTRACT

An image forming apparatus includes an endless belt, an index provided at part of an end edge of the belt, a detecting member, a processing unit, and a storage unit. The detecting member changes an output value thereof based on the passing states of the index and the end edge of the belt in a detection area of the detecting member. The processing unit processes the output value and determines whether the index is present in the detection area by comparing the present output value with a threshold value. The storage unit stores the processed output value. The processing unit acquires a reference value based on the stored output value. The processing unit, when determining whether the index is present in the detection area, sets as the threshold value a value obtained by changing the most recently acquired reference value by a predetermined value.

4 Claims, 8 Drawing Sheets

IMAGE FORMING APPARATUS HAVING LOOPED BELT AND METHOD OF DETECTING INDEX

INCORPORATION BY REFERENCE

This application is based upon, and claims the benefit of priority from the corresponding Japanese Patent Application No. 2012-024646, filed on Feb. 8, 2012, the entire contents of which are incorporated herein by reference.

BACKGROUND

The present disclosure relates to an image forming apparatus equipped with a looped belt and a method of detecting an index.

Some image forming apparatuses are equipped with, for example, a plurality of photoconductor drums so as to be capable of performing color printing using toner images of a plurality of mutually different colors. In such image forming apparatuses, endless belts, such as an intermediate transfer belt and a sheet transportation belt, may be used when each of toner images borne by the surface of the photoconductor drum is transferred onto a sheet of paper.

In order to determine the timing at which, for example, the toner image is formed or a sheet is transported, the position of the belt, in the rotational direction, needs to be precisely detected. In order to detect the position of the belt in the rotational direction, an index may be provided at part of one of the end edges of the belt. In this situation, the index is rotated together with the end edge of the belt. In such a structure, a detecting member is located in a rotational path of the index. The detecting member detects the index, thereby allowing the position of the belt in the rotational direction to be detected.

Assuming that, as an example, the detecting member uses a through-beam sensor. In this situation, when the index passes through the detection area of the detecting member, the amount of light blocked in the detection area is increased, and when the index has completely passed through the detection area of the detecting member, the amount of light blocked in the detection area is decreased. That is, the output value of the detecting member is different depending on whether or not the index is passing through the detection area. Thus, the index can be detected based on the output value of the detecting member.

An endless belt, such as the intermediate transfer belt or the sheet transportation belt, rotates while being looped over a plurality of rollers. However, the belt may meander due to causes such as insufficient precision in the manufacture or installation of the rollers, shifting of the axes of these rollers, a non-uniform thickness of the belt, a non-uniform tensile force by which the intermediate transfer belt is stretched, and so forth. That is, the end edge positions of the belt may move in a direction wherein the end edge positions move close to or away from the detecting member. Accordingly, when the belt meanders, the precision with which the index is detected may be degraded.

Specifically, a threshold value, which serves as a reference with which whether or not the index is present in the detection area of the detecting member is determined, is typically a fixed value. For example, assuming that a fixed threshold value is set, such that the timing at which the output value of the detecting member changes by a specified amount matches the timing at which the index is detected when the belt does not meander, that is, the end edges of the belt are in an ideal state wherein the end edges of the belt are not shifted from the set rotational path of the belt. In this situation, when the belt meanders, the output level of the detecting member generally changes while the threshold value remains at a fixed level. When the detecting member has, for example, a through-beam sensor, the output level of the detecting member is generally decreased or increased because the amount of light that is blocked in the detection area increases when the end edges of the belt move in the direction wherein the end edges move close to the detecting member, and the amount of light that is blocked in the detection area decreases when the end edges of the belt move in the direction wherein the end edges move away from the detecting member.

Accordingly, in the situation wherein the output waveform (amount of change in output value) of the detecting member is changed into a rounded waveform while the index is passing through the detection area, the index is detected when the output value of the detecting member has changed by an amount greater than the above-described specified amount, or when the output value of the detecting member has changed by an amount smaller than the above-described specified amount. That is, precision with which the index is detected may be degraded.

SUMMARY

An image forming apparatus according to an embodiment of the present disclosure includes an endless belt, an index, a detecting member, a processing unit, and a storage unit. The endless belt is looped over a plurality of rollers so as to rotate. The index is provided at part of an end edge of the belt so as to rotate together with the belt. The detecting member, a detection area of which is defined at part of a rotational path of the index and the end edge of the belt, changes an output value thereof based on the passing states of the index and the end edge of the belt in the detection area. The processing unit obtains the output value of the detecting member at regular intervals, processes the obtained output value, and determines whether or not the index is present in the detection area of the detecting member by comparing the present output value of the detecting member with a threshold value. The storage unit stores the output value of the detecting member having been processed by the processing unit. The processing unit acquires a reference value used to set the threshold value based on the output value of the detecting member obtained at the regular intervals, and, when the processing unit determines whether or not the index is present in the detection area of the detecting member, the processing unit sets as the threshold value a value obtained by changing the most recently acquired reference value by a predetermined value.

A method of detecting an index according to another embodiment of the present disclosure includes: first rotating an endless belt that is looped over a plurality of rollers and has an index provided at part of an end edge of the belt; generating an output value based on the passing states of the index and the end edge of the belt in a detection area of a detecting member using the detecting member, wherein the detection area of the detecting member is defined at part of a rotational path of the index and the end edge of the belt, and the detecting member changes the output value thereof based on the passing states of the index and the end edge of the belt in the detection area; determining whether or not the index is present in the detection area of the detecting member using a processing unit based on a comparison of the present output value of the detecting member with a threshold value, wherein the output value of the detecting member is obtained at regular intervals and processed; storing in a storage unit the output value of the detecting member having been processed by the processing unit; and acquiring a reference value, which is used to set the threshold value, using the processing unit based on the output value of the detecting member obtained at the regular intervals and stored in the storage unit, and, when the processing unit determines whether or not the index is present in the detection area of the detecting member, setting as the threshold value using the processing unit a value obtained by changing the most recently acquired reference value by a predetermined value.

Additional features and advantages are described herein, and will be apparent from the following Detailed Description and the figures.

DETAILED DESCRIPTION

Figure 1:
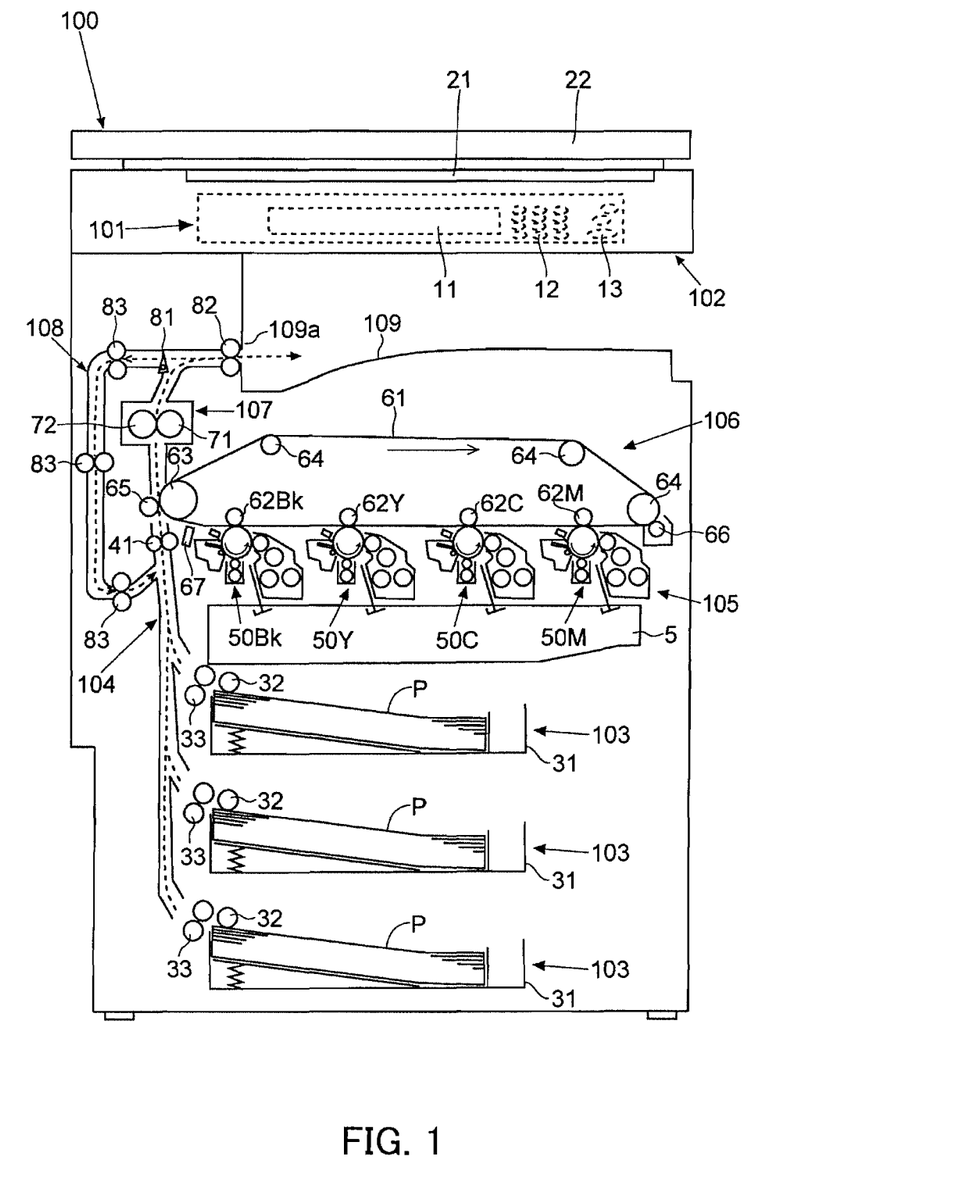
FIG. 1 illustrates a configuration of an image forming apparatus according to an embodiment of the present disclosure.

Referring to FIG. 1, a general configuration of an image forming apparatus 100 according to an embodiment of the present disclosure is described.

The image forming apparatus 100 according to the embodiment is a color multi-functional peripheral to which a tandem configuration is applied. A plurality of types of jobs such as copying, printing, scanning, and facsimiling can be performed in the image forming apparatus 100. The image forming apparatus 100 includes an operation panel 101, an image reading unit 102, a sheet feed unit 103, a first transportation unit 104, an image forming section 105, an intermediate transfer unit 106, a fixing unit 107, and a second transportation unit 108.

The operation panel 101 is located on a front surface side of the image forming apparatus 100. The operation panel 101 includes a liquid crystal display unit 11 that has a touch screen that covers a display surface of the liquid crystal display unit 11. Menus and setting keys (soft keys), with which a variety of settings and the like are performed, and messages that notify of apparatus states and the like are displayed on the liquid crystal display unit 11. The operation panel 101 also includes a numerical keypad 12, a start key 13, and the like. The numerical keypad 12 accepts numerical values input by the user. The start key 13 accepts instructions indicative of the start of a variety of jobs from the user.

The image reading unit 102 reads an original document and generates image data of an image to be formed. Although not illustrated in the drawings, the image reading unit 102 includes optical system components such as an exposure lamp, mirrors, lenses, and an image sensor. In the image reading unit 102, image data is generated by illuminating an original document placed on a contact glass 21 with light, receiving the light reflected by the original document with the image sensor, and performing an analog to digital (A/D) conversion on values output from pixels of the image sensor. Thus, the image data is obtained through an original document reading operation performed by the image reading unit 102, and printing in accordance with the image data is possible. The image data obtained through the original document reading operation performed by the image reading unit 102 can also be stored. When reading the original document with the image reading unit 102, a document cover 22 can be used to press the original document placed on the contact glass 21.

The sheet feed unit 103 includes a plurality of cassettes 31 that stores sheets of paper P and feeds the sheets P stored in the plurality of cassettes 31 to the first transportation unit 104. Each of the sheets P serves as a recording medium. The sheet feed unit 103 also includes pickup rollers 32 and separation roller pairs 33. The pickup rollers 32 pick up the sheet P stored in the cassettes 31. The separation roller pairs 33 suppress multiple feeding of the sheets P.

The first transportation unit 104 feeds the sheet P along a main transportation path. That is, the first transportation unit 104 causes the sheet P fed from the sheet feed unit 103 to pass through the intermediate transfer unit 106 and the fixing unit 107 in this order, and to be fed to a discharge tray 109. The first transportation unit 104 includes a registration roller pair 41, which causes the sheet P to wait in front of the intermediate transfer unit 106 and to be fed to the intermediate transfer unit 106 at adjusted timing.

The image forming section 105, which forms a toner image in accordance with image data of an image to be printed, includes an exposure device 5 and image forming units 50 provided for four colors. The image forming units 50 include an image forming unit 50Bk that forms a black toner image, an image forming unit 50Y that forms an yellow toner image, an image forming unit 50C that forms a cyan toner image, and an image forming unit 50M that forms a magenta toner image. The image forming units 50Bk, 50Y, 50C, and 50M, which form toner images corresponding to respective colors, have structures generally similar to one another. Thus, signs that indicate the colors (Bk, Y, C and M) are omitted in the following description.

Figure 2:
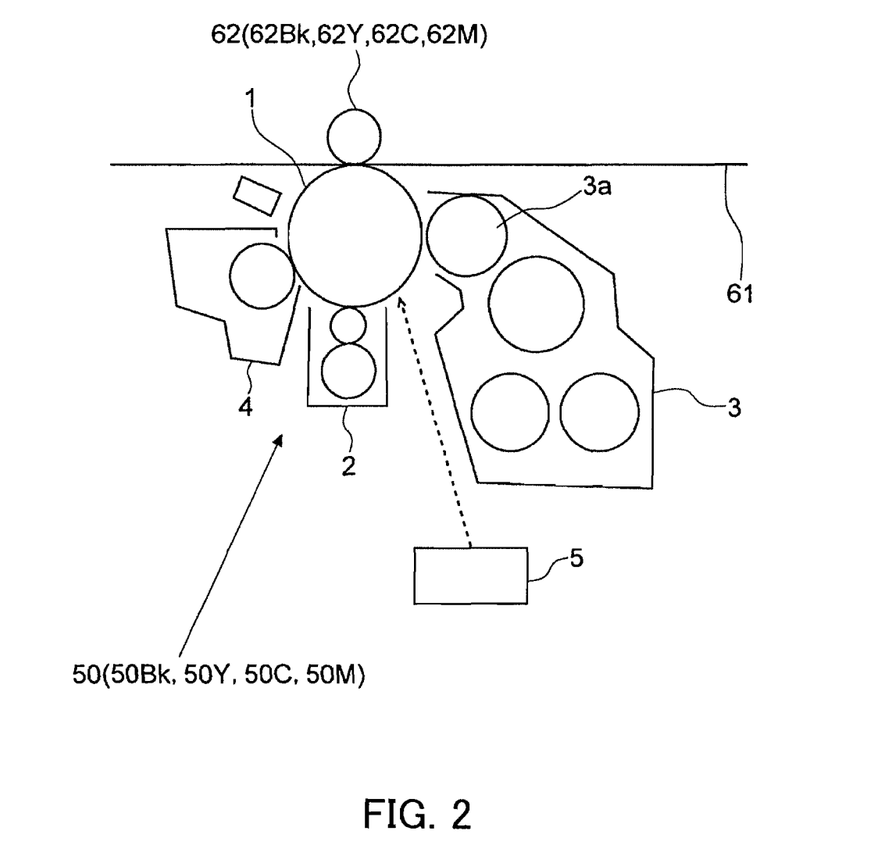
FIG. 2 illustrates an image forming section of the image forming apparatus according to an embodiment of the present disclosure.

As illustrated in FIG. 2, each of the image forming units 50 includes a photoconductor drum 1, a charger 2, a developing device 3, and a cleaning device 4.

Each photoconductor drum 1 bears a toner image on an outer peripheral surface thereof and is supported such that the photoconductor drum 1 is rotatable in a peripheral direction. Each of the chargers 2 causes a corresponding one of the photoconductor drums 1 to be charged at a certain potential. Each of the developing devices 3 stores a developer of a corresponding one of the colors and supplies toner to an electrostatic latent image formed on the outer peripheral surface of a corresponding one of the photoconductor drums 1. Each of the cleaning devices 4 cleans a corresponding one of the photoconductor drums 1.

The exposure device 5 emits beams so as to scan and expose the outer peripheral surface of each photoconductor drum 1 in accordance with image data after the outer peripheral surface of each photoconductor drum 1 has been charged, thereby forming an electrostatic latent image on the outer peripheral surface of each photoconductor drum 1. When the toner is supplied to the electrostatic latent image formed on the outer peripheral surface of each photoconductor drum 1, a toner image according to the image data is borne by the outer peripheral surface of each photoconductor drum 1.

Although not illustrated in the drawings, the exposure device 5 includes components such as semiconductor laser elements, polygon mirrors, polygon motors, Fθ lenses, and reflecting mirrors. A set of the components of the exposure device 5 may be provided for each image forming unit 50. Alternatively, a set of the semiconductor laser element, the Fθ lens, and the reflecting mirrors may be provided for each image forming unit 50 while the polygon mirror and the polygon motor are shared by the image forming units 50 for two colors (or four colors).

Referring back to FIG. 1, the image forming apparatus 100 will be described. The intermediate transfer unit 106 receives toner images from the image forming section 105 through primary transfer and then performs secondary transfer so that the toner images are transferred onto the sheet P. The intermediate transfer unit 106 at least includes an endless intermediate transfer belt 61 and primary transfer rollers 62Bk, 62Y, 62C, and 62M, each of which is assigned to a corresponding one of the image forming units 50. The intermediate transfer belt 61 is provided with an index 61*a* (see FIG. 4) at part of an end edge on one of sides in the width direction thereof. The intermediate transfer belt 61 is rotatably looped. Although the details will be described later, the index 61*a* is used when detecting the position of the intermediate transfer belt 61 in the rotational direction. Each of the primary transfer rollers 62Bk, 62Y, 62C and 62M and a corresponding one of the image forming units 50 (specifically the photoconductor drums 1) pinch the intermediate transfer belt 61 therebetween. Also, a primary transfer voltage as a primary transfer bias is applied to each of the primary transfer rollers 62Bk, 62Y, 62C and 62M.

The intermediate transfer unit 106 also includes a drive roller 63 and driven rollers 64. The drive roller 63 and the driven rollers 64 together with the primary transfer rollers 62Bk, 62Y, 62C, and 62M stretch the intermediate transfer belt 61. When the drive roller 63 rotates, the intermediate transfer belt 61 rotates, and the index 61*a* (see FIG. 4) rotates together with the intermediate transfer belt 61. The drive roller 63 is rotated by a drive force transmitted from an intermediate transfer motor M (see FIG. 3), which is controlled to drive by a main controller 110 that is described later.

The intermediate transfer unit 106 also includes a secondary transfer roller 65. The secondary transfer roller 65 and the drive roller 63 pinch the intermediate transfer belt 61 therebetween. Also, a secondary transfer voltage as a secondary transfer bias is applied to the secondary transfer roller 65.

The toner images formed in the individual image forming units 50 are sequentially transferred onto the intermediate transfer belt 61 through the primary transfer (primary transfer process) so as to be superposed with one another without being misaligned with one another by the primary transfer rollers 628*k*, 62Y, 62C, and 62M, to each of which the primary transfer voltage is applied. That is, a full-color toner image is transferred onto the intermediate transfer belt 61. The toner image, having been transferred onto the intermediate transfer belt 61 through the primary transfer, is then transferred onto the sheet P through the secondary transfer (secondary transfer process) by the secondary transfer roller 65, to which the secondary transfer voltage is applied.

The intermediate transfer unit 106 also includes a belt cleaning device 66. The belt cleaning device 66 cleans the intermediate transfer belt 61 after the toner images have been transferred from the intermediate transfer belt 61 onto the sheet P through the secondary transfer.

The fixing unit 107 includes a fixing roller 71 and a pressure roller 72. The fixing roller 71 includes a heat source therein and the pressure roller 72 is pressed against the fixing roller 71. The sheet P onto which the toner images have been transferred, through the secondary transfer, is caused to pass through the nip between the fixing roller 71 and the pressure roller 72, thereby being heated and pressurized. Thus, the toner images have been fixed onto the sheet P (fixing process).

After passing through the fixing unit 107, the sheet P is ejected to the discharge tray 109. Thus, printing is completed.

The second transportation unit 108 allows printing to be performed on both sides of the sheet P and transports the sheet P along a transportation path for both side printing. The transportation path for both side printing branches from the main transportation path downstream of the fixing unit 107 in a transportation direction of the sheet P and joins the main transportation path upstream of the registration roller pair 41 in the transportation direction of the sheet P. The second transportation unit 108 includes a switching claw 81, a discharge roller pair 82, and transportation roller pairs 83. The switching claw 81 is located at a branching point where the transportation path for both side printing branches from the main transportation path. The discharge roller pair 82 is located at a discharge opening 109*a* that is connected to the discharge tray 109. Rotational directions of the rollers of the discharge roller pair 82 are switchable between the respective forward and reverse directions. The transportation roller pairs 83 feed the sheet P.

When printing is performed on both sides of the sheet P, the switching claw 81 closes the transportation path for both side printing and directs the sheet P fed from the fixing unit 107 to the discharge tray 109. The rollers of the discharge roller pair 82 initially rotate in the respective forward directions so as to eject part of the sheet P to the discharge tray 109. After that, the discharge roller pair 82 temporarily stops before the sheet P has completely passed through the discharge roller pair 82. Then, the rollers of the discharge roller pair 82 rotate in the respective reverse directions. At this time, the switching claw 81 rotates in a direction wherein the transportation path for both side printing is opened. Thus, the sheet P, on one side of which an image has been printed, is fed to the transportation path for both side printing.

After that, the sheet P is fed by the transportation roller pairs 83 to the side upstream of the registration roller pair 41. Then, the sheet P is fed again from the intermediate transfer unit 106 to the fixing unit 107. At this time, since the front and back sides of the sheet P have been inverted, the secondary transfer process and the fixing process is performed on the back side (not printed side) of the sheet P. The sheet P, both sides of which have undergone printing, is ejected to the discharge tray 109.

Figure 3:
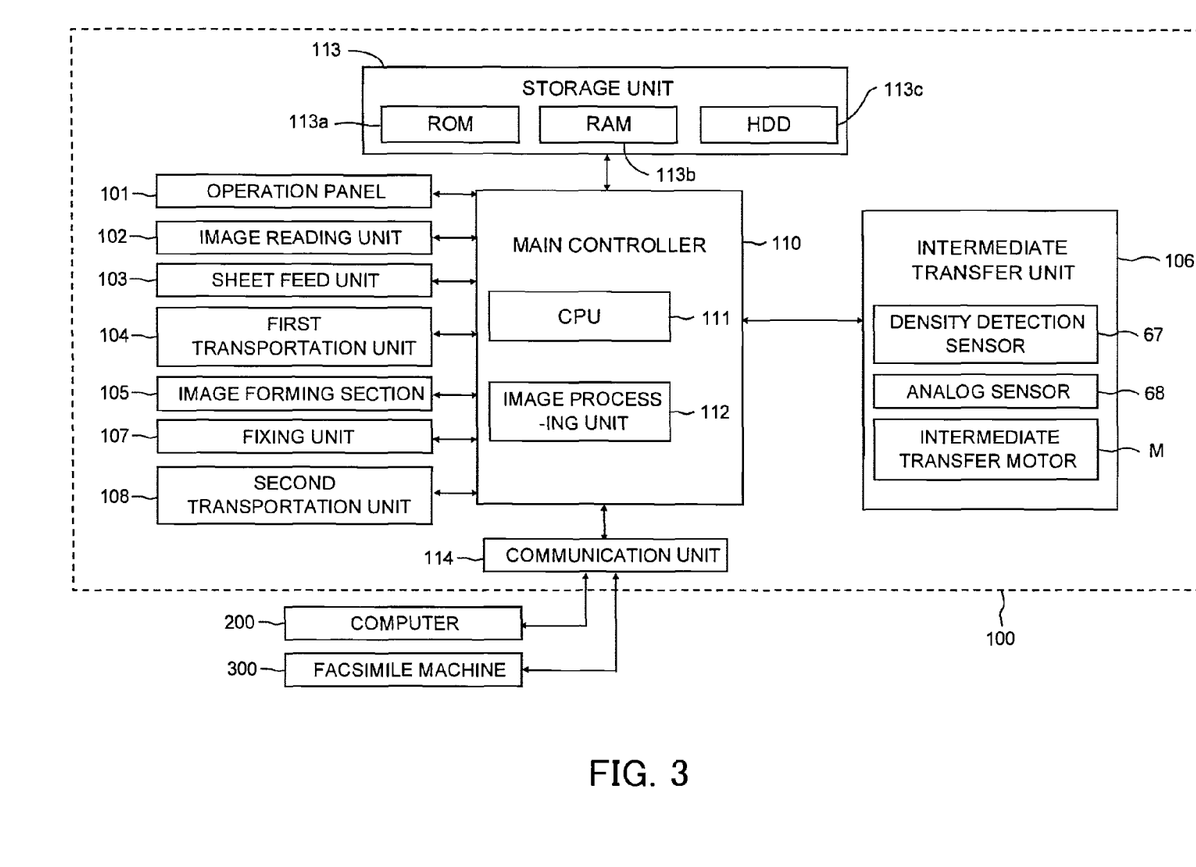
FIG. 3 is a block diagram of a hardware configuration of the image forming apparatus according to an embodiment of the present disclosure.

Referring next to FIG. 3, the hardware configuration of the image forming apparatus 100 is described.

The image forming apparatus 100 includes the main controller 110. The main controller 110 includes a central processing unit (CPU) 111 and an image processing unit 112. The main controller 110 is connected to the operation panel 101, the image reading unit 102, the sheet feed unit 103, the first transportation unit 104, the image forming section 105, the intermediate transfer unit 106, the fixing unit 107, and the second transportation unit 108. The main controller 110, for example, controls the section, units, and the like and performs computation in accordance with programs and data stored in a storage unit 113. The main controller 110 may be divided into a control unit that performs general and image processing controls and an engine control unit that controls drive of motors that rotate a variety of rotating bodies.

The storage unit 113 includes a volatile storage device such as a random access memory (RAM) 113b, non-volatile storage devices such as a read-only memory (ROM) 113a, and a hard disk drive (HDD) 113c. A variety of programs, data, and the like are stored in the ROM 113a and loaded in the RAM 113b.

The main controller 110 is connected to a communication unit 114. The communication unit 114 is communicably connected to an external computer 200 through a network (or a cable). Thus, the image forming apparatus 100 can perform printing in accordance with image data transmitted from the computer 200. Furthermore, the image forming apparatus 100 can transmit image data, which is obtained through a document reading operation performed by the image reading unit 102, to the computer 200. The communication unit 114 may include a modem therein. In this situation, the image forming apparatus 100 can perform facsimile communication with an external facsimile machine 300 through a network such as a telephone line.

Here, the intermediate transfer unit 106 connected to the main controller 110 includes a density detection sensor 67 located near the intermediate transfer belt 61 (see FIG. 1). The density detection sensor 67 uses a reflective optical sensor. The density detection sensor 67 emits light toward a surface of the intermediate transfer belt 61 and changes the output thereof based on the amount of the light reflected from the surface of the intermediate transfer belt 61. The output of the density detection sensor 67 is received by the main controller 110. The main controller 110 performs, for example, image density calibration based on the output of the density detection sensor 67. The image density calibration refers to an operation in which a patch toner image for image density adjustment is transferred onto the intermediate transfer belt 61, the image density of the transferred patch toner image is detected, and, for example, a voltage applied to a developing roller 3a, which is a component of the developing device 3 illustrated in FIG. 2, is adjusted based on the image density of the patch toner image.

In order to perform image density calibration, the main controller 110 causes the patch toner image to be transferred to a specified position on the surface of the intermediate transfer belt 61 while causing the intermediate transfer belt 61 to rotate. The main controller 110 detects the image density of the patch toner image (simply referred to as "patch density" hereafter) based on the output of the density detection sensor 67. Furthermore, before detecting the patch density, the main controller 110 detects the image density of the surface of the intermediate transfer belt 61 at the specified position (the position to which the patch toner image will be transferred) on the surface of the intermediate transfer belt 61 based on the output of the density detection sensor 67 in a state wherein the patch toner image has not yet been transferred. The image density thus detected is simply referred to as "background density" hereafter. Then, the main controller 110 calculates an uncorrected patch density value by subtracting the background density value from the patch density value. This cancels out the effects of light reflected by the background of the intermediate transfer belt 61 on the patch density value. After that, the main controller 110 causes the voltage applied to the developing roller 3a to be adjusted in accordance with the uncorrected patch density value.

The intermediate transfer unit 106 also includes an analog sensor 68 (corresponding to a detecting member) in order to detect the position of the intermediate transfer belt 61 in the rotational direction, that is, to detect the index 61a. The analog sensor 68 uses a through-beam sensor having a light emitter and a light receiver and changes the output voltage value thereof based on the amount of light received by the light receiver. The output voltage value of the analog sensor 68 increases as the amount of light received by the light receiver increases, and decreases as the amount of light received by the light receiver decreases.

Figure 4:
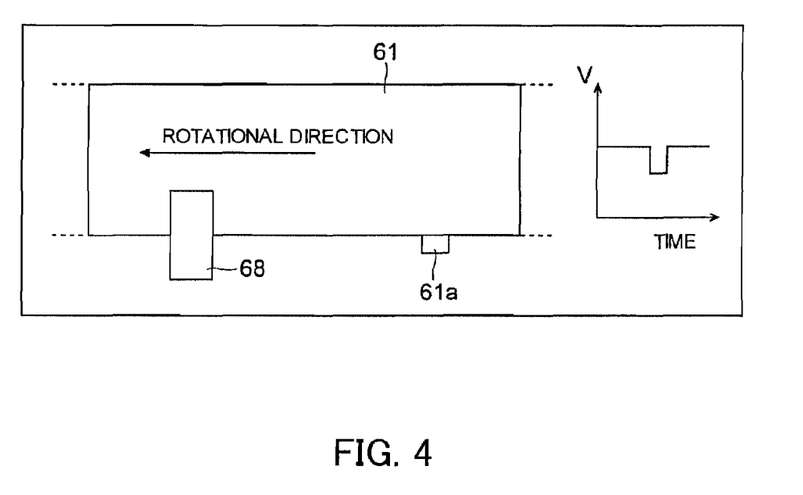
FIG. 4 illustrates a state wherein the position of an intermediate transfer belt does not shift in the image forming apparatus according to an embodiment of the present disclosure.

In the analog sensor 68, which has a substantially C shape structure in sectional view, the light emitter and the light receiver are respectively positioned on upper and lower inner surfaces of the C-shaped structure. As illustrated in FIG. 4, the light emitter and the light receiver of the analog sensor 68 are located on one side and on the other of a rotational path of the index 61a respectively. Thus, the output voltage value of the analog sensor 68 differs between a state wherein the index 61a is present between the light emitter and the light receiver and a state wherein the index 61a is not present between the light emitter and the light receiver.

Specifically, as illustrated in the graph on the right in FIG. 4, the graph representing the relationship between the output voltage value of the analog sensor 68 and time, when the index 61a reaches a detection area defined between the light emitter and the light receiver of the analog sensor 68, the output voltage value of the analog sensor 68 falls and decreases. The output voltage value of the analog sensor 68 remains low while the index 61a is passing through the detection area of the analog sensor 68. Then, after the index 61a has completely passed through the detection area of the analog sensor 68, the output voltage value of the analog sensor 68 rises and increases (recovers).

The main controller 110 periodically samples the output voltage value of the analog sensor 68. The output voltage value of the analog sensor 68 may undergo an A/D conversion performed by the CPU 111 of the main controller 110 (see FIG. 3). Alternatively, a separate A/D converter may be provided and perform this A/D conversion. The main controller 110 detects the position of the intermediate transfer belt 61 in the rotational direction, that is, detects the index 61a, in accordance with the output voltage value of the analog sensor 68. Thus, the main controller 110 can determine the timing at which the patch toner image is transferred onto the surface of the intermediate transfer belt 61 when the image density calibration is performed. As a result, the position at which the patch density is measured and the position at which the background density is measured can be matched to each other. Furthermore, the main controller 110 can also determine the timing at which an image is formed in a usual printing operation.

The output voltage value of the analog sensor 68 is also used to detect the position of one of the end edges of the intermediate transfer belt 61. That is, the main controller 110 detects the end edge position of the intermediate transfer belt 61 and the index 61a based on the output voltage value of a single analog sensor 68.

For this reason, the analog sensor 68 is located at such a position that the end edge of the intermediate transfer belt 61 and the index 61a are allowed to pass through the detection area. The position at which the analog sensor 68 is located such that, in the situation wherein the end edge positions of the intermediate transfer belt 61 are not shifted from reference positions illustrated by broken lines in FIG. 4, the output voltage value of the analog sensor 68 becomes a middle value of the output width of the analog sensor 68 while not detecting the index 61a.

Figure 5:
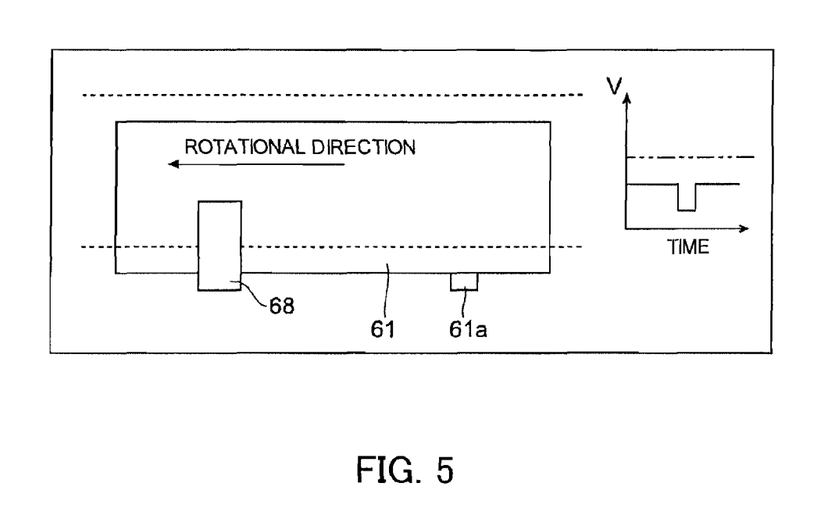
FIG. 5 illustrates a state wherein the position of the intermediate transfer belt has shifted in the image forming apparatus according to an embodiment of the present disclosure.

Assuming that the end edge positions of the intermediate transfer belt 61 are, as illustrated in FIG. 5, shifted in a direction wherein the end edge positions move towards the analog sensor 68 from the respective reference positions illustrated by the broken lines in FIG. 5. In this situation, the amount of light blocked in the detection area of the analog sensor 68 is larger as compared to when the end edge positions of the intermediate transfer belt 61 are not shifted from the respective reference positions (state illustrated in FIG. 4). Thus, as illustrated in the graph on the right in FIG. 5, the output voltage value of the analog sensor 68 is lower compared to when the end edge positions of the intermediate transfer belt 61 are not shifted (state illustrated in FIG. 4). A two-dot chain line in the graph in FIG. 5 represents an output voltage value of the analog sensor 68 when the index 61a is not detected in the situation wherein the end edge positions of the intermediate transfer belt 61 are not shifted from the respective reference positions.

Figure 6:
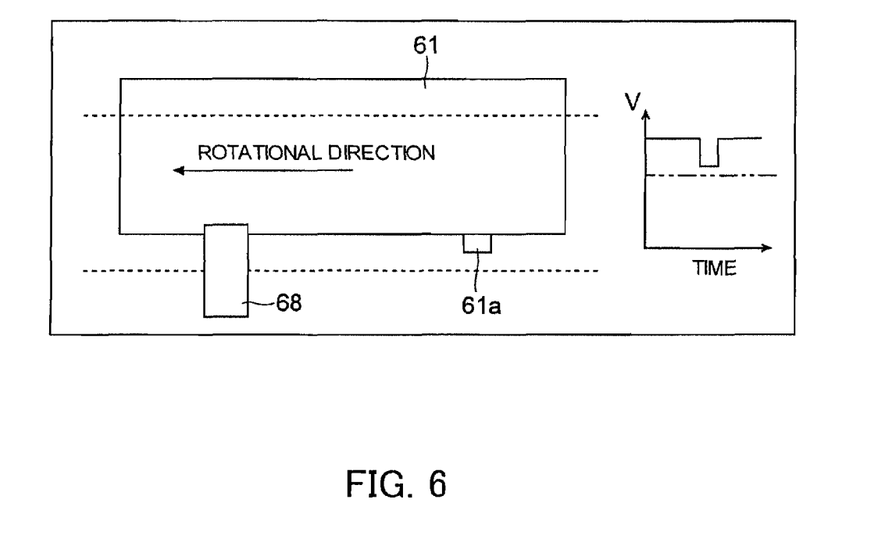
FIG. 6 illustrates a state wherein the position of the intermediate transfer belt has shifted in the image forming apparatus according to an embodiment of the present disclosure.

Assuming that the end edge positions of the intermediate transfer belt 61 are, as illustrated in FIG. 6, shifted in a direction wherein the end edge positions move away from the analog sensor 68 from the respective reference positions represented by the broken lines in FIG. 6. In this situation, the amount of light blocked in the detection area of the analog sensor 68 is smaller compared to when the end edge positions of the intermediate transfer belt 61 are not shifted (state illustrated in FIG. 4). Thus, as illustrated in the graph on the right in FIG. 6, the output voltage value of the analog sensor 68 is higher compared to when the end edge positions of the intermediate transfer belt 61 are not shifted from the respective reference positions (state illustrated in FIG. 4). A two-dot chain line in the graph in FIG. 6 represents an output voltage value of the analog sensor 68 when the index 61a is not detected in the situation wherein the end edge positions of the intermediate transfer belt 61 are not shifted from the respective reference positions.

The main controller 110 periodically samples the output voltage value of the analog sensor 68. The main controller 110 detects the end edge position of the intermediate transfer belt 61 (or amount and direction of shift) based on the output voltage value of the analog sensor 68. The storage unit 113 stores position detection data including the relationship between the output voltage value of the analog sensor 68 and the end edge position (or amount and direction of shift) of the intermediate transfer belt 61. The main controller 110 detects the end edge position (or amount and direction of shift) of the intermediate transfer belt 61 based on the output voltage value of the analog sensor 68 and the position detection data.

Figure 7:
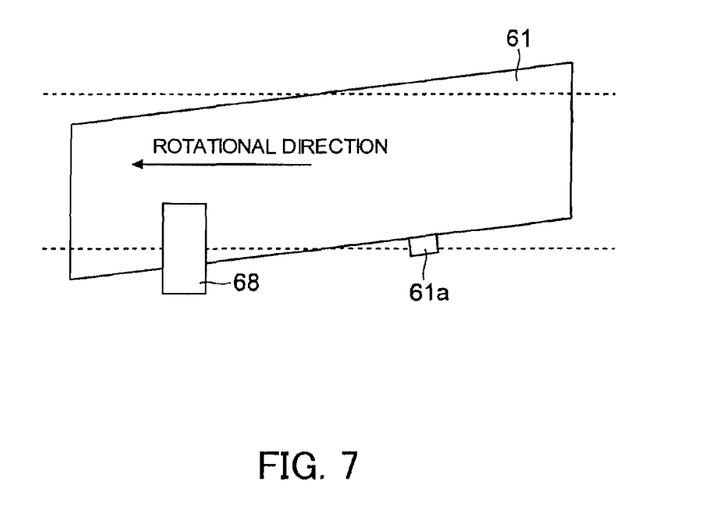
FIG. 7 illustrates a state wherein the intermediate transfer belt meanders in the image forming apparatus according to an embodiment of the present disclosure.

As illustrated in FIG. 7, the intermediate transfer belt 61 may meander. In this situation, the end edge positions of the intermediate transfer belt 61 change as the number of rotations of the intermediate transfer belt 61 increases. Broken lines in FIG. 7 represent the reference positions, which are end edge positions of the intermediate transfer belt 61 that does not meander. Causes of meandering of the intermediate transfer belt 61 include insufficient precision in the manufacture or installation of the rollers over which the intermediate transfer belt 61 is looped, shifting of the axes of these rollers, a non-uniform thickness of the intermediate transfer belt 61, a non-uniform tensile force by which the intermediate transfer belt 61 is stretched, and so forth.

Figure 8:
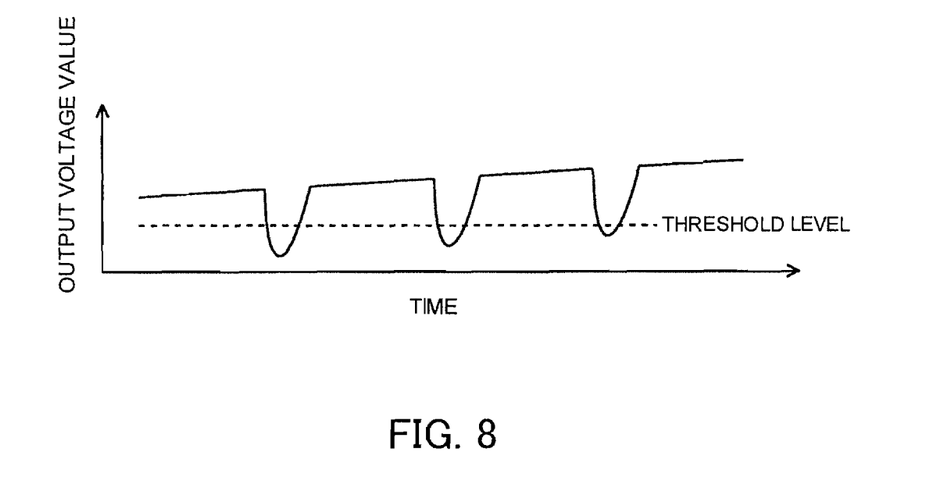
FIG. 8 illustrates a problem that occurs when a threshold value, which serves as a reference with which whether or not an index is detected is determined, is a fixed value.

When the intermediate transfer belt 61 meanders as described above, the output voltage value of the analog sensor 68, that indicates the end edge position of the intermediate transfer belt 61, gradually changes as illustrated in FIG. 8. Even when the intermediate transfer belt 61 meanders, an output waveform (amount of change in output voltage value) of the analog sensor 68 observed when the index 61a passes through the detection area of the analog sensor 68 is substantially unchanged. However, in this situation, the output waveform of the analog sensor 68 becomes bilaterally asymmetric instead of being symmetric.

In the situation wherein a threshold value (broken line in FIG. 8), which serves as a reference as to whether or not the index 61a is detected, is fixed, the index 61a is not precisely detected. When the output voltage value of the analog sensor 68 changes as illustrated in FIG. 8, as the number of rotations of the intermediate transfer belt 61 increases, the time, from when the index 61a reaches the detection area of the analog sensor 68 to when the index 61a is detected, gradually shifts.

Figure 9:
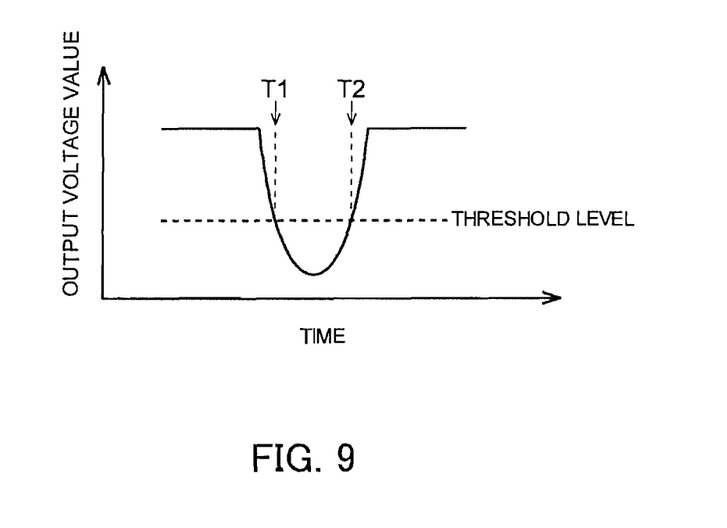
FIG. 9 illustrates an example of a method of detecting the index.
Figure 10:
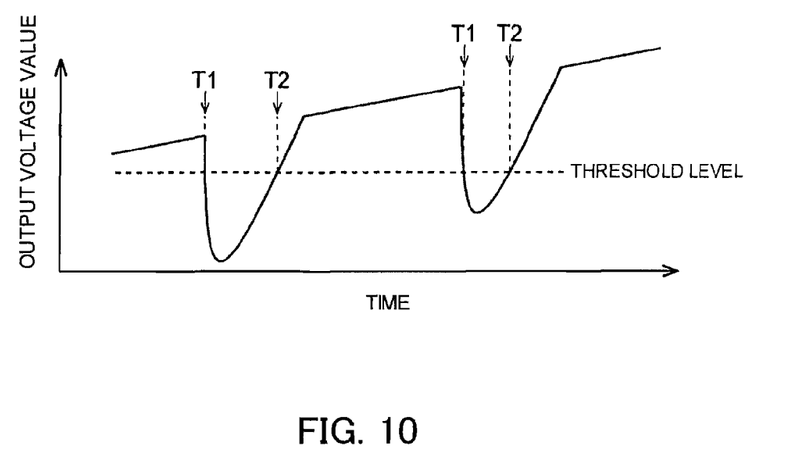
FIG. 10 illustrates a problem with the method of detecting the index illustrated in FIG. 9.

Assuming that the output waveform of the analog sensor 68 is bilaterally symmetrical when the index 61a passes through the detection area of the analog sensor 68. In this situation, by setting the detection point of the index 61a to the middle point between the fall point T1 and the rise point T2 of the output of the analog sensor 68 as illustrated in FIG. 9, the gradual shift of the timing, at which the index 61a is detected, occurs as the number of rotations of the intermediate transfer belt 61 increases can be suppressed. However, as illustrated in FIG. 10, the actual output waveform of the analog sensor 68 observed when the index 61a passes through the detection area of the analog sensor 68 is asymmetric. Thus, even when the method illustrated in FIG. 9 is adopted, the index 61a cannot be precisely detected.

As described above, in the situation wherein the index 61a cannot be precisely detected, the timing at which the patch toner image is transferred onto the surface of the intermediate transfer belt 61 cannot be precisely controlled when the image density calibration is performed. This makes it difficult, on the surface of the intermediate transfer belt 61, to precisely match the position where the patch density is measured to the position where the background density is measured, thereby degrading the precision with which the image density calibration is performed.

In an embodiment, the main controller 110 obtains the output voltage value of the analog sensor 68 at regular intervals (for example, every 1.25 milliseconds) and causes the obtained values to be stored in the storage unit 113. The main controller 110 acquires a reference value based on the output voltage value of the analog sensor 68 obtained at regular intervals. The reference value is used to set the threshold value, with which whether or not the index 61a is present in the detection area of the analog sensor 68 is determined. In order to determine whether or not the index 61a is present in the detection area of the analog sensor 68, the main controller 110 sets as the threshold value the value obtained by changing the most recently acquired reference value by a predetermined value.

Specifically, the main controller 110 calculates an average of the individual output voltage values of the analog sensor 68 during a predetermined length of time (referred to as a first average value hereafter). Every time the main controller 110 obtains the output voltage value of the analog sensor 68, the main controller 110 averages ten individual output voltage values of the analog sensor 68 most recently obtained so as to calculate the first average value. Furthermore, every time the main controller 110 obtains the output voltage value of the analog sensor 68, the main controller 110 calculates an average value again, which is an average of a plurality of (for example, five) most recently calculated first average values (referred to as a second average value hereafter). In order to determine whether or not the index 61*a* is present in the detection area of the analog sensor 68, the main controller 110 sets the threshold value using the most recently calculated second average value as the reference value. That is, the main controller 110 sets as the threshold value the value obtained by changing the second average value by the predetermined value (in an embodiment, the value obtained by subtracting the predetermined value from the second average value). The first average values, the second average values, and the threshold value calculated by the main controller 110 are stored in the storage unit 113.

Figure 11:
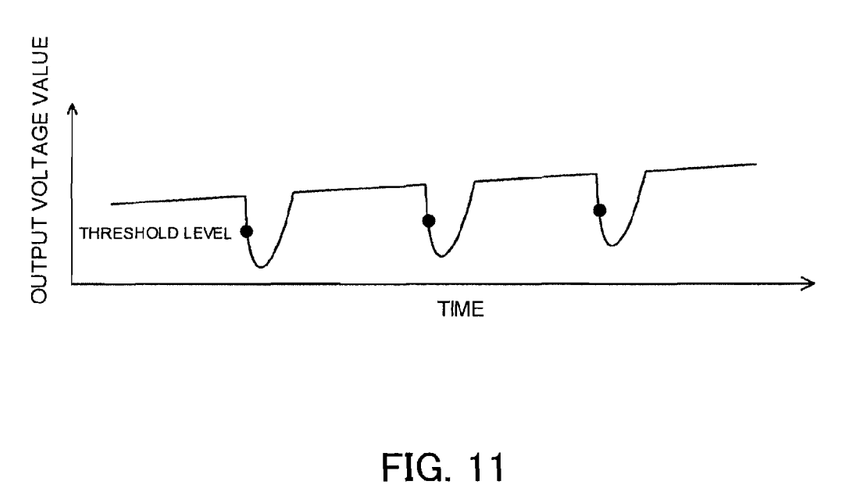
FIG. 11 illustrates a method of detecting the index in the image forming apparatus according to an embodiment of the present disclosure.

Thus, as illustrated in FIG. 11, the threshold value (dots in FIG. 11), which is used to determine whether or not the index 61*a* is present in the detection area of the analog sensor 68, changes in accordance with the meandering state of the intermediate transfer belt 61. That is, in the situation wherein the output level of the analog sensor 68 generally gradually increases by a gradual movement of the end edge positions of the intermediate transfer belt 61 in the direction wherein the end edge positions move away from the analog sensor 68, the threshold value gradually increases based on the changes in the output level of the analog sensor 68. In contrast, although it is not illustrated in the drawings, in the situation wherein the output level of the analog sensor 68 generally gradually decreases by a gradual movement of the end edge positions of the intermediate transfer belt 61 in the direction wherein the end edge positions move towards the analog sensor 68, the threshold value gradually decreases based on the output level of the analog sensor 68. Accordingly, when the index 61*a* passes through the detection area of the analog sensor 68, despite the meandering of the intermediate transfer belt 61, the main controller 110 detects the index 61*a*, that is, the main controller 110 determines that the index 61*a* is present in the detection area of the analog sensor 68, when the output voltage value of the analog sensor 68 has changed by a certain amount.

The absolute value of the above-described predetermined value is smaller than the amount of change in the output voltage value of the analog sensor 68 when the index 61*a* passes through the detection area, and greater than the amount of change in the output voltage value of the analog sensor 68 when the intermediate transfer belt 61 most significantly meanders. This is due to the fact that detection of the index 61*a* becomes impossible in the situation where the value equal to or greater than the amount of change in the output voltage value of the analog sensor 68 when the index 61*a* passes through the detection area is used as the above-described predetermined value. In the situation where a value equal to or less than the amount of change in the output voltage value of the analog sensor 68 when the intermediate transfer belt 61 most significantly meanders is used as the above-described predetermined value, there may be a false detection of the index 61*a* when the output voltage value of the analog sensor 68 is changed by meandering of the intermediate transfer belt 61.

Figure 12:
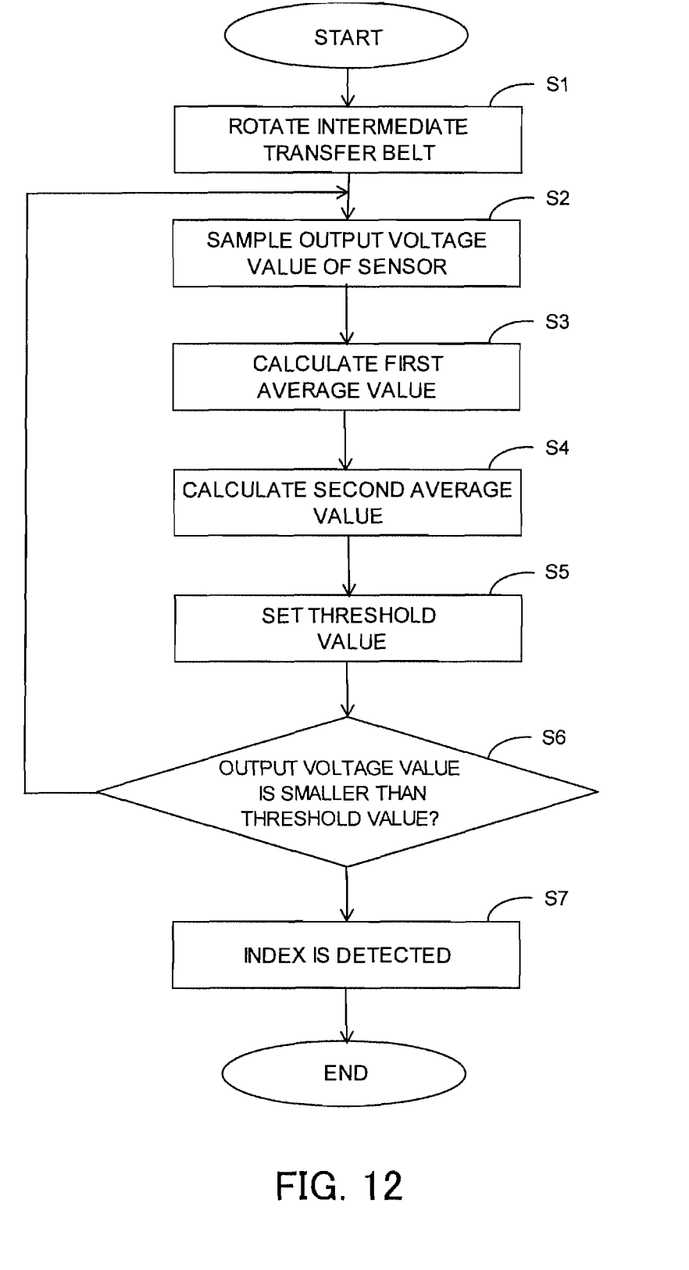
FIG. 12 illustrates an operation in which the index is detected in the image forming apparatus according to an embodiment of the present disclosure.

Referring next to FIG. 12, the operation performed when the position of the intermediate transfer belt 61 in the rotational direction is detected is described up to a point where the index 61*a* is detected.

In image density calibration and usual printing, the index 61*a* needs to be precisely detected in order to determine the timing at which a toner image is transferred onto the intermediate transfer belt 61. Accordingly, the flow illustrated in FIG. 12 starts at a time when the intermediate transfer belt 61 rotates to perform image density calibration or usual printing.

In step S1, the main controller 110 causes the intermediate transfer motor M to drive, thereby rotating the intermediate transfer belt 61 at a predetermined speed. In step S2, the main controller 110 starts sampling the output voltage value of the analog sensor 68. Here, the main controller 110 causes the storage unit 113 to store the output voltage value of the analog sensor 68 having been sampled.

In step S3, every time the main controller 110 obtains the output voltage value of the analog sensor 68, the main controller 110 averages a plurality of (for example, ten) individual output voltage values of the analog sensor 68 most recently obtained and stored in the storage unit 113 so as to calculate the first average value. The main controller 110 causes the storage unit 113 to store the calculated first average value. In step S4, every time the main controller 110 obtains the output voltage value of the analog sensor 68, the main controller 110 further averages a plurality of (for example, five) individual first average values most recently calculated and stored in the storage unit 113 so as to calculate the second average value. The main controller 110 causes the storage unit 113 to store the calculated second average value.

In step S5, the main controller 110 acquires the reference value used as a reference to set the threshold value with which whether or not the index 61*a* is present in the detection area of the analog sensor 68 is determined, and sets the threshold value. Here, the main controller 110 sets the second average value stored in the storage unit 113 as the reference value. The main controller 110 sets as the threshold value the value obtained by changing the second average value by the predetermined value, for example, the value obtained by subtracting the predetermined value from the second average value. The main controller 110 causes the storage unit 113 to store the set threshold value.

In step S6, the main controller 110 determines whether or not the index 61*a* is present in the detection area of the analog sensor 68. That is, the main controller 110 determines whether or not the present output voltage value of the analog sensor 68 is less than the threshold value stored in the storage unit 113. As a result of the determination, if the present output voltage value of the analog sensor 68 is less than the threshold value, the process advances to step S7, and the main controller 110 recognizes that the index 61*a* has been detected. That is, it is recognized that the index 61*a* is present in the detection area of the analog sensor 68. In contrast, if the present output voltage value of the analog sensor 68 is not less than the threshold value, the process returns to step S2.

In the flow illustrated in FIG. 12, step S4 may be omitted. That is, the first average value may be set as the reference value.

The detection process of index 61*a* may be suspended until a certain length of time has passed from the time when the index 61*a* has been detected. Here, the certain length of time is the time, for example, required for the index 61*a* to completely pass through the detection area of the analog sensor 68.

As described above, in an embodiment, the main controller 110 (corresponding to a processing unit) acquires the reference value used to set the threshold value based on the output value of the analog sensor 68 (corresponding to the detecting member) obtained at regular intervals. In this situation, in order to determine whether or not the index 61*a* is present in the detection area of the analog sensor 68, the main controller 110 sets as the threshold value the value obtained by changing the most recently acquired reference value by the predetermined value. That is, in the situation where the intermediate transfer belt 61 (corresponding to a belt) meanders (in the situation wherein the end edge positions of the intermediate transfer belt 61 move in the direction wherein the end edge positions move towards or away from the analog sensor 68), the main controller 110 sets the threshold value as follows: when the output level of the analog sensor 68 generally increases, the main controller 110 sets a large threshold value in accordance with a change in the output level of the analog sensor 68, and when the output level of the analog sensor 68 generally decreases, the main controller 110 sets a small threshold value in accordance with a change in the output level of the analog sensor 68. Accordingly, when the index 61a passes through the detection area of the analog sensor 68, despite meandering of the intermediate transfer belt 61, the main controller 110 detects the index 61a (determines that the index 61a is present in the detection area of the analog sensor 68) when the output value of the analog sensor 68 has changed by a certain amount. As a result, the position of the intermediate transfer belt 61 in the rotational direction can be precisely detected (the index 61a can be precisely detected).

As described above, in an embodiment, the main controller 110 averages the individual output values of the analog sensor 68 during a predetermined length of time so as to calculate the first average value, and acquires the reference value based on the calculated first average value. Thus, even when the output value of the analog sensor 68 varies, the threshold value corresponding to the meandering state of the intermediate transfer belt 61 can be easily obtained.

Furthermore, in an embodiment, the main controller 110 further averages a plurality of calculated first average values so as to calculate the second average value, and acquires the reference value based on the calculated second average value. In an embodiment, the second average value is set as the reference value. Thus, in order to set the threshold value, effects of variation in the output value of the analog sensor 68 can be preferably eliminated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:
an endless belt configured to be looped over a plurality of rollers so as to rotate;
an index provided at a part of an end edge of the belt so as to rotate together with the belt;
a detecting member configured to have a detection area thereof which is defined at a part of a rotational path of the index and the end edge of the belt, and to change an output value thereof based on the passing states of the index and the end edge of the belt in the detection area;
a processing unit configured to obtain the output value of the detecting member at regular intervals, to process the obtained output value, and to determine whether or not the index is present in the detection area of the detecting member by comparing the present output value of the detecting member with a threshold value; and
a storage unit configured to store the output value of the detecting member having been processed by the processing unit,
wherein the processing unit acquires a reference value used to set the threshold value based on the output value of the detecting member obtained at regular intervals and stored in the storage unit, and, when the processing unit determines whether or not the index is present in the detection area of the detecting member, the processing unit sets as the threshold value a value obtained by changing the most recently acquired reference value by a predetermined value, and
wherein the processing unit averages the individual output values of the detecting member output during a predetermined length of time so as to calculate a first average value, further averages a plurality of the calculated first average values so as to calculate a second average value, and acquires the reference value based on the second average value.

2. The image forming apparatus according to claim 1, wherein the predetermined value is less than an amount of change in the output value of the detecting member output when the index passes through the detection area of the detecting member, and greater than an amount of change in the output value of the detecting member output when the belt most significantly meanders.

3. A method of detecting an index comprising:
rotating an endless belt configured to be looped over a plurality of rollers and to have an index provided at a part of an end edge of the belt;
generating an output value based on the passing states of the index and the end edge of the belt in a detection area of a detecting member using the detecting member, the detection area of the detecting member being defined at a part of a rotational path of the index and the end edge of the belt, the detecting member changing the output value thereof based on the passing states of the index and the end edge of the belt in the detection area;
obtaining the output value of the detecting member at regular intervals, processing the output value obtained, and determining whether or not the index is present in the detection area of the detecting member using a processing unit through a comparison of the present output value of the detecting member with a threshold value;
storing in a storage unit the output value of the detecting member having been processed by the processing unit; and
acquiring a reference value using the processing unit based on the output value of the detecting member obtained at the regular intervals and stored in the storage unit, the reference value being used to set the threshold value, and when the processing unit determines whether or not the index is present in the detection area of the detecting member, setting as the threshold value using the processing unit a value obtained by changing the most recently acquired reference value by a predetermined value,
wherein the processing unit averages the individual output values of the detecting member output during a predetermined length of time so as to calculate a first average value, further averages a plurality of the calculated first average values so as to calculate a second average value, and acquires the reference value based on the second average value.

4. The method according to claim 3, wherein the predetermined value is less than an amount of change in the output value of the detecting member output when the index passes through the detection area of the detecting member, and greater than an amount of change in the output value of the detecting member output when the belt most significantly meanders.

* * * * *